United States Patent [19]

Menzel

[11] Patent Number: 5,937,416
[45] Date of Patent: Aug. 10, 1999

[54] METHOD FOR PRESERVING DATA IN AN ELECTRONIC DOCUMENT

[75] Inventor: Ralph E. Menzel, Westland, Mich.

[73] Assignee: Bennethum Computer Systems, West Bloomfield, Mich.

[21] Appl. No.: 08/824,366

[22] Filed: Mar. 25, 1997

[51] Int. Cl.$^6$ ........................................................ G06F 3/14
[52] U.S. Cl. ............................................ 707/512; 707/511
[58] Field of Search .................................. 707/512, 528, 707/505, 100, 200, 202, 511

[56] References Cited

U.S. PATENT DOCUMENTS

| | | |
|---|---|---|
| 3,872,448 | 3/1975 | Mitchell, Jr. . |
| 5,163,148 | 11/1992 | Walls . |
| 5,265,230 | 11/1993 | Saldanha et al. . |
| 5,301,286 | 4/1994 | Rajani . |
| 5,341,293 | 8/1994 | Vertelney et al. ................. 364/419.17 |
| 5,347,579 | 9/1994 | Blandford . |
| 5,386,545 | 1/1995 | Gombos, Jr. et al. . |
| 5,446,884 | 8/1995 | Schwendemann et al. . |
| 5,455,946 | 10/1995 | Mohan et al. . |
| 5,515,502 | 5/1996 | Wood . |
| 5,557,722 | 9/1996 | DeRose et al. ........................... 395/148 |
| 5,559,942 | 9/1996 | Gough et al. ............................ 395/155 |
| 5,572,422 | 11/1996 | Nematbakhsh et al. . |
| 5,581,682 | 12/1996 | Anderson et al. ....................... 395/792 |

*Primary Examiner*—Joseph H. Feild
*Assistant Examiner*—Alford W. Kindred
*Attorney, Agent, or Firm*—Bliss McGlynn, P.C.

[57] ABSTRACT

A method is disclosed for preserving entered data in an electronic document from being obliterated with additional data. A code address or flag is assigned to each electronic document. The code address identifies the electronic document as modifiable or non-modifiable. If the electronic document is modifiable, entered data may be obliterated or destroyed by entering additional data thereover. If the code address identifies the electronic data as non-modifiable, the entered data is preserved by preventing additional data to be entered which will obliterate the previously entered data. The entered data becomes annotations to the electronic document having a non-destructible format, i.e., color and masking, allowing an operator to freely add additional data without destroying the entered data.

10 Claims, 3 Drawing Sheets

METHOD FOR PRESERVING DATA IN AN ELECTRONIC DOCUMENT

BACKGROUND OF THE INVENTION

1. Field of the Invention

The invention relates to a method for preserving data in an electronic document. More particularly, the invention relates to a method for preserving data in an electronic document while annotating the electronic document.

2. Description of the Related Art

Modifying electronic documents, i.e., documents of data stored in electronic form, enables operators of such systems to reduce their dependency on paper. Modifying documents electronically does, however, present a special problem in environments requiring the preservation of the data input into the electronic document, regardless of the timeliness or relevance of the data currently in the electronic document. More specifically, data having historical significance with respect to the event or events being recorded should not be destroyed. Protection of this information is required in environments such as doctors offices, dentists offices, and the like where it is critical for historical information never to be obliterated.

U.S. Pat. No. 5,347,579, issued to Blandford, discloses a method for generating a personal diary using a computer system. The system receives all entries, coupled with a code. The code identifies which of those entries must be maintained and which of those entries may be "torn out" or removed from the electronic diary. The system, however, requires the existence of two versions for each data block; one which is time-stamped and stored forever, and another which is a working block capable of being edited. Storing data twice is a cumbersome, time consuming, memory consuming protocol.

Pen-based computer systems add another dimension to the loss of data problem because, unlike text and text form inputs typical of most software applications, data can be entered by a stroke of a pen. Each stroke can potentially obliterate data previously entered and considered important to save. Therefore, there is a need in the art for a system which allows a pen-based computer system to function similar to its traditional ink pen/paper counterpart without losing important, historical data regardless of the intent of preservation.

SUMMARY OF THE INVENTION

A method is disclosed for preserving entered data on an existing electronic document. The method commences with the step of selecting the existing electronic document from a database. A code address is read for the existing electronic document to identify the existing electronic document as having a non-modifiable status. New data is then prevented from writing over the entered data when the code address identifies the non-modifiable status of the entered data to preserve the entered data so long as the existing electronic document remains in an electronic form.

One advantage associated with the invention is the ability to preserve entered data on an existing electronic document. Another advantage is the ability to preserve entered data on an existing electronic document while entering new data into the existing electronic document. Yet another advantage is the ability to enter new data into an existing electronic document while preserving entered data using a pen-based computer. Still another advantage is the ability to preserve entered data on an existing electronic document without storing duplicate documents in memory, thus reducing costs associated with memory.

BRIEF DESCRIPTION OF THE DRAWINGS

Other advantages of the invention will be readily appreciated as the same becomes better understood by reference to the following detailed description when considered in connection with the accompanying drawings, wherein.

DETAILED DESCRIPTION OF THE PREFERRED EMBODIMENT(S)

Figure 1:
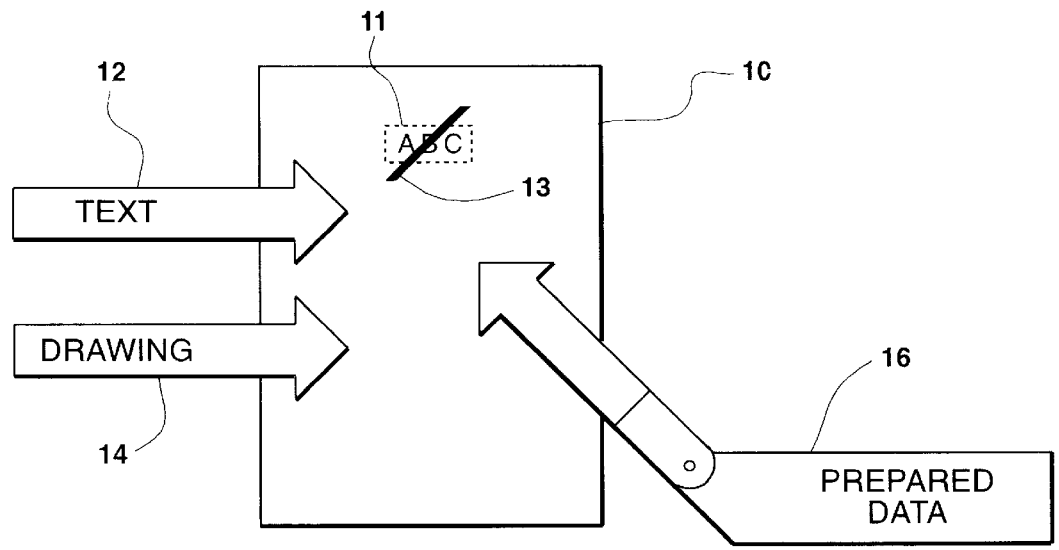
FIG. 1 is a diagrammatic representation of an existing electronic document having a modifiable status.

Referring to FIG. 1, a modifiable electronic document is graphically represented at 10. The modifiable electronic document 10 may be a blank document or, in the alternative, may be a document which has entered data 11 stored therein that is of the type which may be obliterated with additional data 13. Arrows 12, 14 represent text and drawing, respectively, as it is input into the modifiable electronic document 10. A third arrow 16 represents prepared data which may be entered into the modifiable electronic document 10. Prepared data may be forms, charts, or any other type of information which may be retrieved from memory (not shown). The text 12, drawing 14, and prepared data 16 may be entered and removed while the electronic document 10 is modified.

Figure 2:
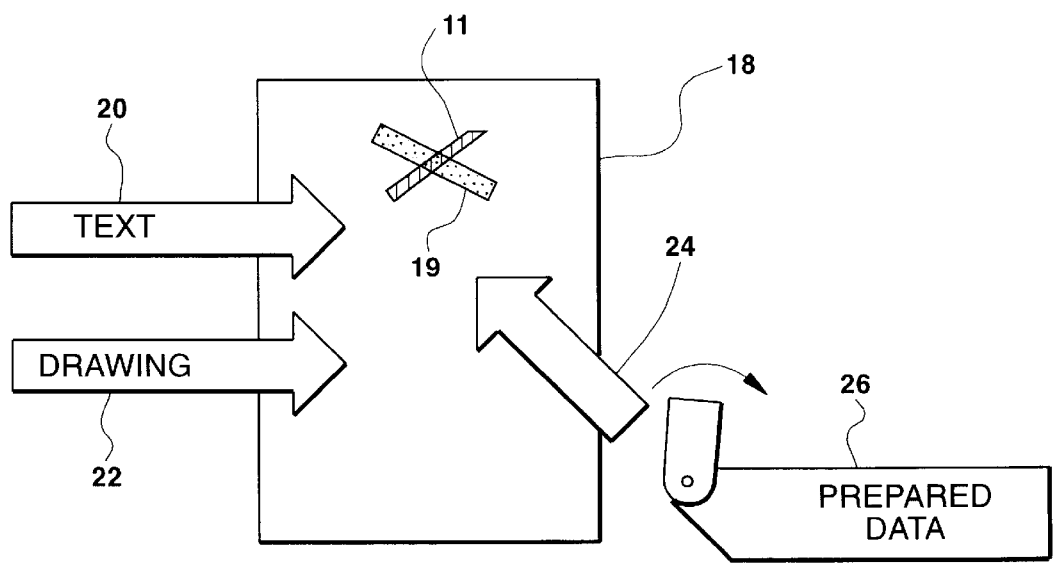
FIG. 2 is a diagrammatic representation of an existing electronic document having a non-modifiable status.

Referring to FIG. 2, a non-modifiable electronic document 18 is diagrammatically shown to receive text and drawings represented by an annotated text arrow 20 and an annotated drawing arrow 22, respectively. Annotated text and annotated drawing may be entered into the non-modifiable electronic document 18. Text and drawing are annotated in that they do not obscure entered data in the non-modifiable electronic document 18. The text and drawing are generated using a special annotation color not available when creating a modifiable electronic document 10. Further, the annotated text and drawing are generated using a masked inking which merges the entered data 11 with the annotated text and drawing 19 rather than obscuring the entered data 11. The entered data 11 is shown with a cross hatch representing one color. The additional data 19 comprising the annotations is shown dotted representing the annotation color which is necessarily different from the one color used to generate the entered data 11.

Because the entered data 11 cannot be obscured in any way in a non-modifiable electronic document 18, prepared data, represented by prepared data arrow 24, is not allowed to enter the non-modifiable electronic document 18. More specifically, a graphically represented switch 26 illustrates that prepared data may not enter the non-modifiable electronic document 18 because prepared data is considered a type which will obstruct the entered data 11 due to the vastness of the data which is prepared. For example, a form, stored as prepared data, will not be transferable into a non-modifiable electronic document 18. This preventative step occurs because the entered data 11 may already incorporate a prepared form or other information which may be difficult to understand if another form is transposed over that data.

Figure 3:
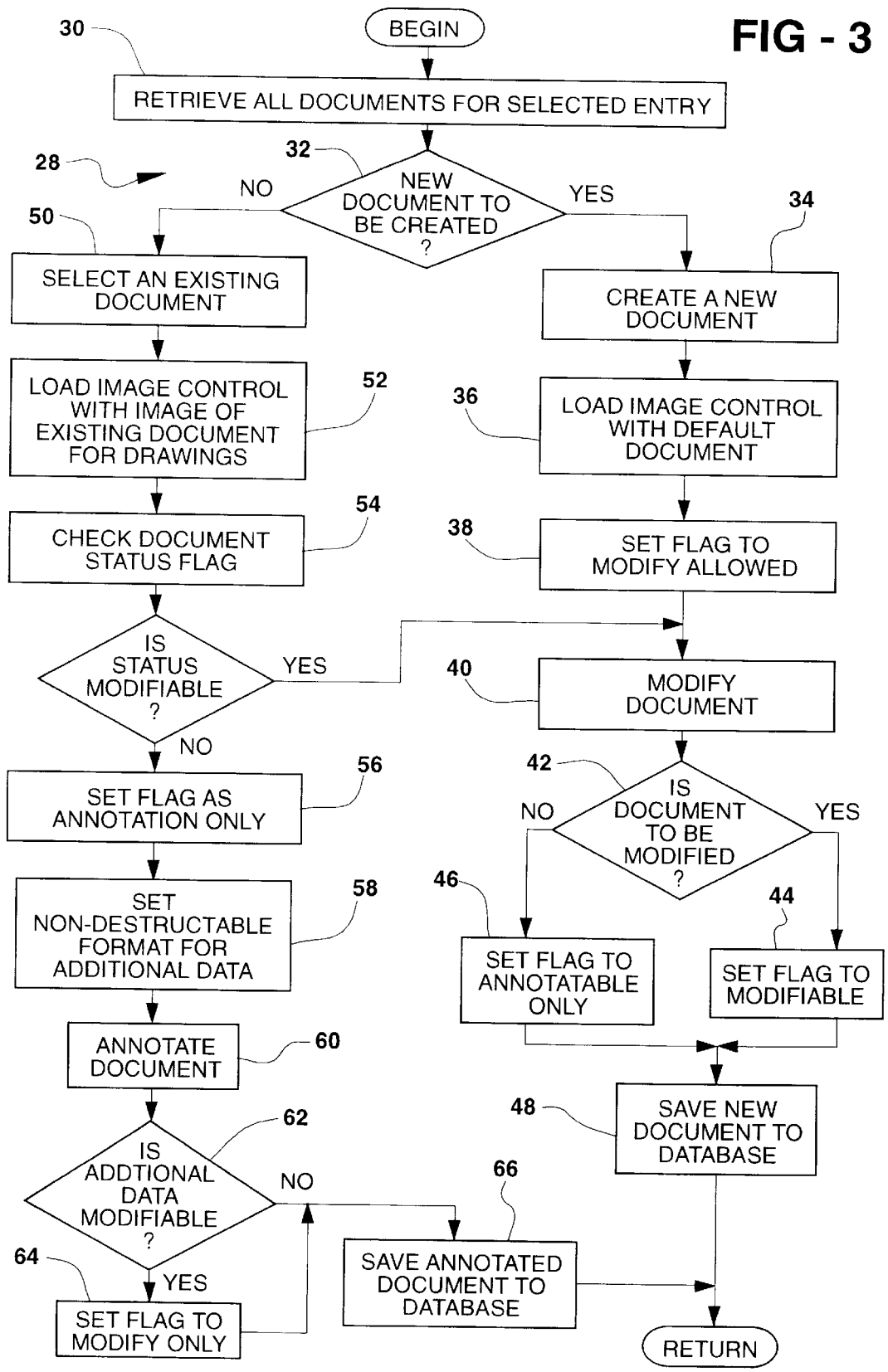
FIG. 3 is a flow chart representation of one method according to the invention.

Referring to FIG. 3, a flow chart for a method for preserving entered data 11 on an existing electronic document 10, 18 is generally indicated at block 28. The method begins by selecting the existing electronic document 10, 18 from a database. This database may be a selection of all documents for a specific entity at block 30. An entity may be a file, a personal history, a doctor's file on a particular person or event, and the like. It is then determined at diamond 32 whether a new document is to be created. If so, a new document is created at block 34. If necessary, a default document having prepared data is loaded into the image control of the computer system at block 36. The new document includes a code address or flag. The code address or flag is set to a modify state at block 38. This allows the new document to be modified by entering text 12, drawings 14, and/or prepared data 16. The document is then modified at block 40. Once created, it is then determined by the author of the modifications whether the document is to be modified in the future at block 42. If so, the code address 38 remains set to modifiable status at 44. If not, the code address or flag 38 is set to annotatable status only at block 46. The annotatable status of the document renders it non-modifiable in the future. The new electronic document is then saved in the database for future reference at block 48.

Figure 4:
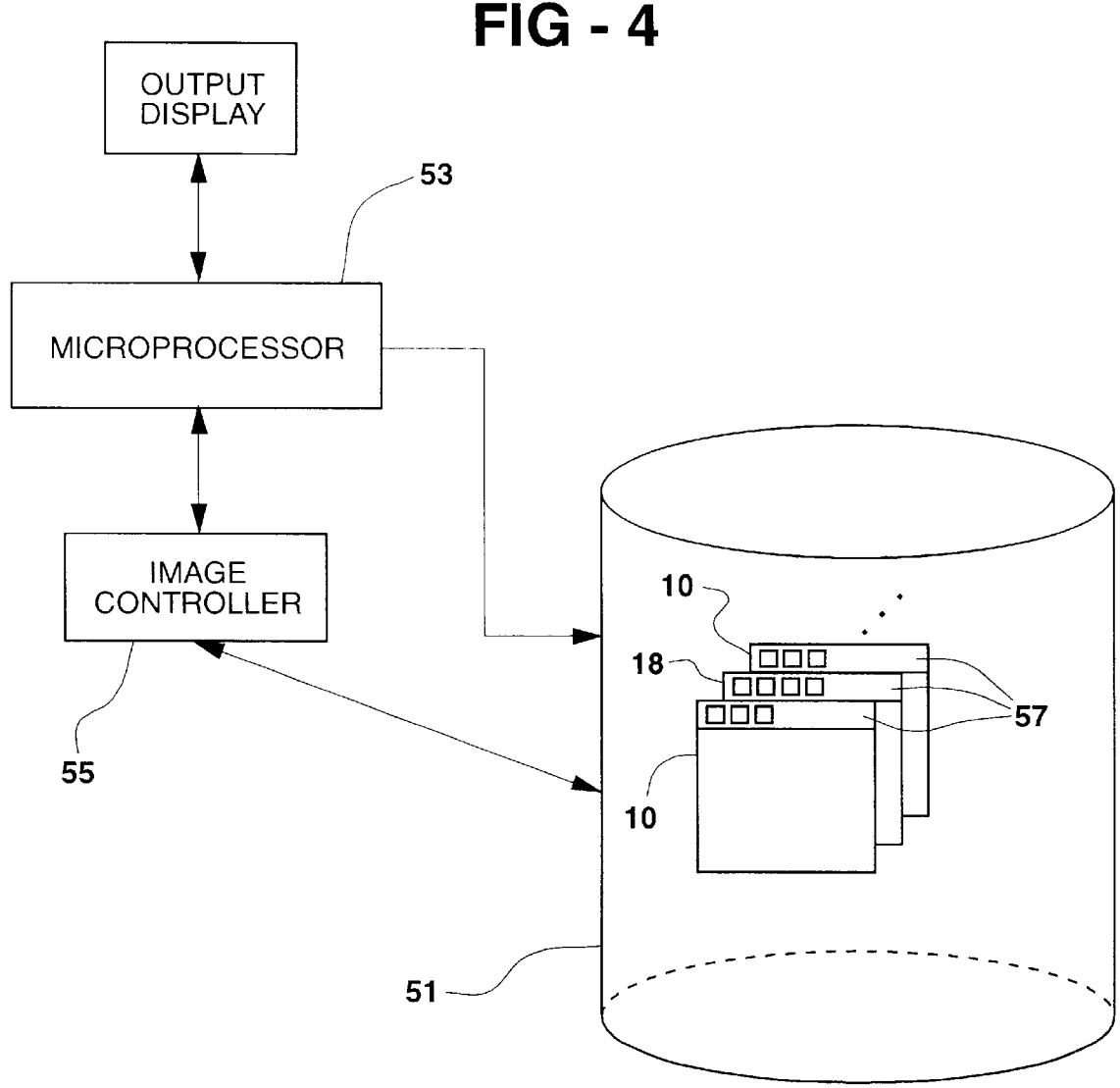
FIG. 4 is a block diagram of an architecture of a computer system capable of performing the inventive method.

If a new electronic document is not to be created (refer to decision diamond 32), an existing electronic document 10, 18 is selected at block 50. The existing electronic document 10, 18 is retrieved from a database 51 by a microprocessor 53 in the computer as shown in FIG. 4. The existing electronic document 10, 18 is then loaded into the image control 55 at block 52. A code address or flag 57, associated with the existing electronic document 10, 18, is read to identify the status thereof at block 54. The code address or flag 57 identifies whether the existing electronic document 10, 18 has a non-modifiable status, i.e., it is annotatable only, or a modifiable status. In the example shown in FIG. 4, the code address 57 of a modifiable electronic document 10 is "0001" and the code address 57 for a non-modifiable electronic document 18 is "0000." If the existing electronic document 10 is determined to have a modifiable status, the existing electronic document 10 is modified similar to executable block 40. If the status of the existing electronic document 18 is non-modifiable as identified by the code address 38, new data is prevented from writing over the entered data 11 to preserve the entered data 11 so long as the existing electronic document 18 remains in an electronic form.

To do so, the code address 38 previously read is set to annotation only at 56. The pen color and inking method for the new data is set in a non-destructive format at 58. The color of the new or additional data is a color which will not be available for the steps of modifying an electronic document. More specifically, annotations will be easily discerned by the difference in color in which the ink is displayed or printed. In one embodiment, the annotation color is maroon. Another feature of the non-destructible format is that the additional data is generated using a masked pen inking format which does not write over entered data. The masked pen inking merges the new data with the entered data such that both may be seen when viewed.

Once the non-destructible format is set, the existing electronic document may be annotated at 60. Upon completing the step of annotating the existing electronic document, it is then determined whether the additional annotations should be modifiable at diamond 62. If so, the code address or flag is set to modify status at block 64. If not, the annotated document is saved in the database at block 66.

Therefore, if the annotations are not to be considered non-modifiable, the annotations themselves may be obliterated or removed from the existing electronic document. If the annotations are to become a permanent part of the electronic document, the annotations will become non-modifiable and will be considered entered data.

The invention has been described in an illustrative manner. It is to be understood that the terminology which has been used is intended to be in the nature of words of description rather than of limitation.

Many modifications and variations of the invention are possible in light of the above teachings. Therefore, within the scope of the appended claims, the invention may be practiced other than as specifically described.

I claim:

1. A method for preserving entered data on an existing electronic document, the method comprising the steps of:

selecting the existing electronic document from a database;

reading a code address for the existing electronic document to identify the existing electronic document as having a non-modifiable status;

preventing new data from writing over the entered data when the code address identifies the non-modifiable status of the entered data to preserve the entered data so long as the existing electronic document remains in an electronic form; and annotating the existing electronic document to create an annotated electronic document from the existing electronic document including the existing data and additional data in a non-destructible format such that the existing data is preserved and readable when the additional data is entered over the existing data.

2. A method as set forth in claim 1 including the step of setting the code address for the additional data to non-modifiable status to preserve the additional data so long as the annotated electronic document remains in the electronic form.

3. A method as set forth in claim 1 including the step of setting the code address for the additional data to a modifiable status when the additional data may be destroyed.

4. A method as set forth in claim 1 including the step of assigning attributes to the non-destructible format so that the additional data is identifiable as annotations when viewed.

5. A method as set forth in claim 4 wherein the step of assigning attributes includes the step of assigning an ink color to the additional data.

6. A method as set forth in claim 4 wherein the step of assigning attributes includes the step of generating the additional data using a masked electronic pen ink to prevent the destruction of the entered data.

7. A method for preserving entered data on an existing electronic document, the method comprising the steps of:

selecting the existing electronic document from a database;

reading a code address for the existing electronic document to identify the existing electronic document as having a non-modifiable status;

preventing new data from writing over the entered data when the code address identifies the non-modifiable status of the entered data to preserve the entered data so long as the existing electronic document remains in an electronic form;

annotating the existing electronic document to create an annotated electronic document from the existing electronic document including the existing data and additional data in a non-destructible format such that the entered data is preserved and readable when the additional data is entered over the existing data;

setting the code address for the additional data to non-modifiable status to preserve the additional data so long as the annotated electronic document remains in the electronic form;

assigning an ink color to the additional data; and preventing the entry of the entered data to be made in the ink color assigned to the entry of additional data.

8. A method as set forth in claim 7 wherein the step of assigning attributes includes the step of generating the additional data using a masked electronic pen ink to prevent the destruction of the entered data.

9. A method for preserving entered data on an existing electronic document, the method comprising the steps of:

selecting an existing document from a database;

reading a code address for the existing electronic document to identify the existing document as having a non-modifiable status;

preventing new data from writing over entered data when the code address identifies the non-modifiable status of the entered data to preserve the entered data so long as the existing electronic document remains in an electronic form;

preventing the entry of prepared data into the electronic document when the code address identifies the non-modifiable status of the entered data to preserve the entered data so long as the existing electronic document remains in an electronic form; and annotating the existing electronic document to create an annotated electronic document from the existing electronic document including the existing data and additional data in a non-destructible format such that the entered data is preserved and readable when additional data is entered over the existing data.

10. A method as set forth in claim 9 wherein the step of assigning attributes includes the step of generating the additional data using a masked electronic pen ink to prevent the destruction of the entered data.

* * * * *